Feb. 22, 1927.
K. L. HERRMANN
1,618,194
INTERNAL COMBUSTION ENGINE
Original Filed Feb. 16, 1925
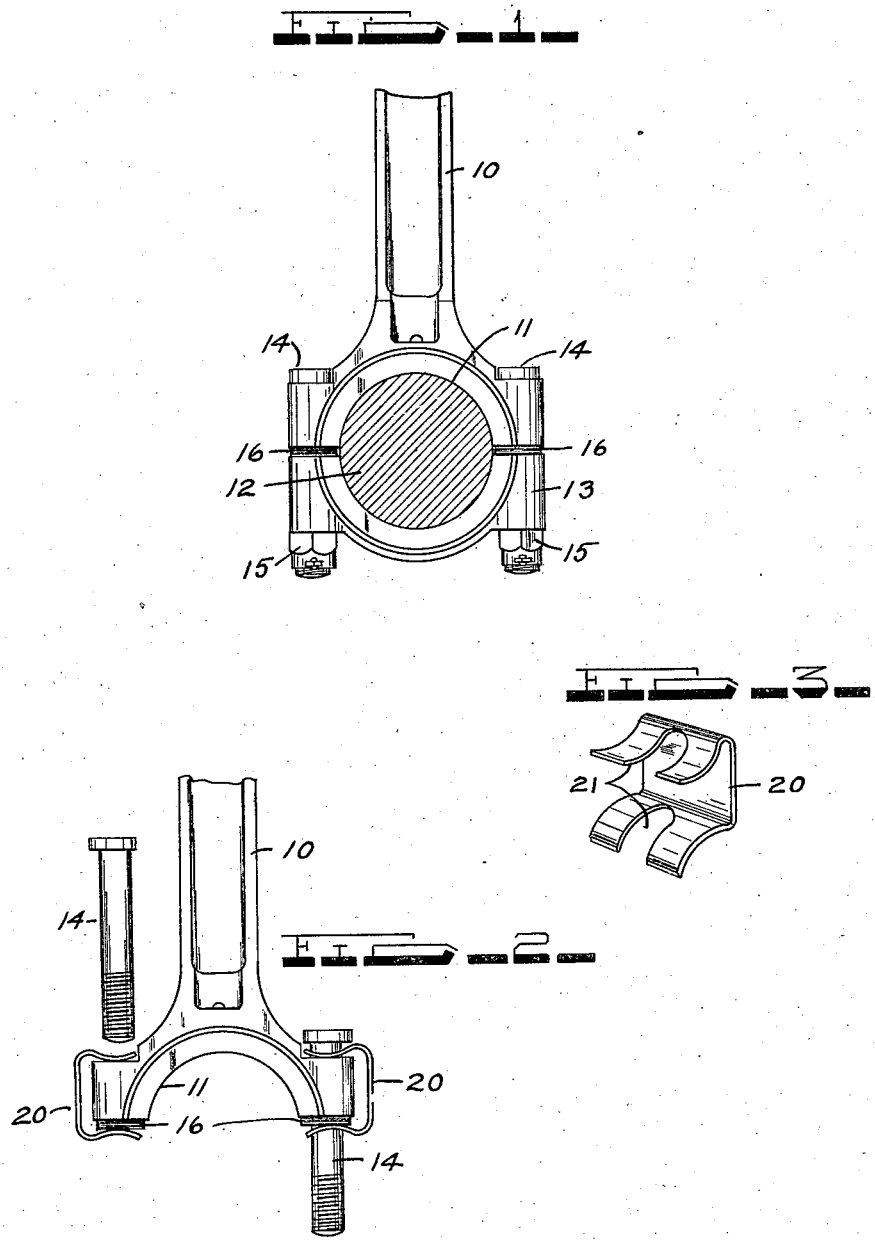
INVENTOR
KARL L. HERRMANN
BY
ATTORNEY Patented Feb. 22, 1927.

1,618,194

UNITED STATES PATENT OFFICE.

KARL L. HERRMANN, OF DETROIT, MICHIGAN, ASSIGNOR TO THE STUDEBAKER CORPORATION, OF DETROIT, MICHIGAN, A CORPORATION OF NEW JERSEY.

INTERNAL-COMBUSTION ENGINE.

Original application filed February 16, 1925, Serial No. 9,575. Divided and this application filed April 22, 1926. Serial No. 103,822.

This application is a division of my application for improvements in internal combustion engines, filed February 16, 1925 and serially numbered 9,575.

This invention relates to internal combustion engines and more particularly to devices used in connection with engine connecting rods and especially to means which assist in the tearing down and assembling of the bearings therefor.

Heretofore, automobile mechanics when assembling a torn down motor have experienced considerable difficulty in replacing the exact number of connecting rod bearing shims. Very frequently, when the bearing shims are removed, part of them are lost or misplaced and much time is lost in determining the necessary number or thickness of shims to insert between the mating surfaces of the bearings. In doing this, it is necessary to remove the bearing bolts and bearing cap several times to get the correct fit between the connecting rod bearings and the crankshaft.

Therefore, it is one of the objects of the present invention to provide engine connecting rods with a new and novel means for holding the bearing shims in place after the bearing is disassembled.

Another object is to provide a connecting rod with a spring member for retaining the bearing shims in place after the bearing is disassembled.

A still further object is to provide a shim retaining member adapted to slip over both the top of the connecting rod bearing and the bearing shims whereby the shims may be held in place while the bearing is being torn down or assembled.

The above being among the objects of the present invention, the same consists in certain features of construction and combination of parts to be hereinafter described with reference to the accompanying drawing, and then claimed, having the above and other objects in view.

In the accompanying drawing which illustrates a suitable embodiment of the present invention, and in which like numerals refer to like parts throughout the several views, Fig. 1 is a side view of the crank end of a connecting rod showing the same in assembled position on the crank shaft.

Fig. 2 is a side view showing the connecting rod of Fig. 1 disassembled from its cap, and showing the device embodying the present invention holding the shims in place thereon.

Figure 3 is a perspective view of the shim holding device by itself.

The connecting rod 10, in connection with which the present invention is shown, is of the conventional type having a semi-circular bearing surface 11 which is adapted to receive the crank shaft 12 and which is adapted to be closed by the complemental bearing cap 13 secured thereto by the usual bolts 14 and nuts 15. As is the usual practice a plurality of relatively thin shims 16 are interposed between the joining surfaces of the cap 13 and rod 10 to facilitate fitting of the same to the crank shaft 12, and as previously explained, it is these shims that often become lost or misplaced when tearing down an engine, with resulting loss of time and labor. To prevent the loss and misplacement of these shims, the present invention provides the shim retainers shown which comprise a resilient U-shaped member 20 provided with slots 21 in the projecting portions thereof of a width slightly greater than the thickness of the connecting rod bolts 14. The projecting portions or prongs are slightly curved and the normal space therebetween is substantially the same or slightly less than the depth of the edge of the cap engaging portion of the connecting rod 10, so that when in operative position the resiliency of the prongs will draw the shims 16 firmly up against the lower face of this cap engaging portion and hold the same in such position when the bolts 14 are removed as shown in Figure 2.

In using this device the mechanic first removes the nuts 15 and bearing cap 13 and then raises the bolts 14 a sufficient amount to slip the retainer 20 underneath the head and around the shank portion, the bottom portion of the retainer 20 resting against the lowest of the shims 16. When the retainers 20 are in this position the bolts 14 can be removed, thereby giving the mechanic tearing down the job the assurance that when he removes the bolts 14 from the rod 10 and bearing cap 13, the shims 16 will remain in place and he need not fear losing the same, and will not be required to remove the cap 13 several times before he obtains the correct fit. When he assembles the rod 10 he merely places the same on the crankshaft 12, inserts the bolts 14, puts on the bearing cap 13, removes the retainers 20 and slips on and tightens the nuts 15.

Although the retainers 20 are shown in the drawing as holding the shims 16 to the rod 10, it is quite apparent that they are equally well adapted to hold the shims 16 on the bearing cap 13 when in disassembled position.

It can be seen from the foregoing that the shim retainer described is simple in construction, economical to manufacture and provides a very efficient means for holding connecting rod bearing shims in place while an engine is being torn down.

Formal changes may be made in the specific embodiment of the invention described without departing from the spirit and substance of the broad invention the scope of which is commensurate with the appended claims.

What I claim is:

1. For use in an engine provided with a connecting rod formed of a plurality of members, and shims interposed therebetween; a resilient U-shaped member provided with bifurcated ends engageable with one of said members and said shims to hold said shims in fixed relation with said member when separated from the other member.

2. For use in an engine provided with a connecting rod having a rod portion and a cap portion, shims interposed therebetween, and a bolt for drawing said portions and shims together; a resilient U-shaped retaining member provided with bifurcated ends engageable with said rod portion and shims and extending around said bolt to hold said shims in fixed position on said rod portion.

3. For use in an engine provided with a connecting rod formed of a plurality of members having bosses thereon adapted to receive bolts for securing said members together, and shims interposed between said members; a resilient U-shaped member adapted to span the depth of one of said bosses and hold said shims thereagainst when said members are separated.

Signed by me at Detroit, Michigan, U. S. A., this 17th day of April, 1926.

KARL L. HERRMANN.